United States Patent
Doi et al.

(10) Patent No.: US 11,298,714 B2
(45) Date of Patent: Apr. 12, 2022

(54) INTERMITTENT AIR-GENERATING DEVICE

(71) Applicant: SMC CORPORATION, Chiyoda-ku (JP)

(72) Inventors: Yoshitada Doi, Koshigaya (JP); Masayuki Oshima, Tsukuba (JP); Naomi Hasegawa, Ishioka (JP)

(73) Assignee: SMC CORPORATION, Chiyoda-ku (JP)

( * ) Notice: Subject to any disclaimer, the term of this patent is extended or adjusted under 35 U.S.C. 154(b) by 446 days.

(21) Appl. No.: 16/339,616

(22) PCT Filed: Sep. 11, 2017

(86) PCT No.: PCT/JP2017/032603
§ 371 (c)(1),
(2) Date: Apr. 4, 2019

(87) PCT Pub. No.: WO2018/066310
PCT Pub. Date: Apr. 12, 2018

(65) Prior Publication Data
US 2021/0291215 A1    Sep. 23, 2021

(30) Foreign Application Priority Data
Oct. 5, 2016    (JP) ............................. JP2016-197050

(51) Int. Cl.
*F16K 11/07*    (2006.01)
*F15B 11/06*    (2006.01)
(Continued)

(52) U.S. Cl.
CPC .............. *B05B 12/06* (2013.01); *F16K 11/07* (2013.01); *F15B 11/06* (2013.01); *F15B 21/12* (2013.01);
(Continued)

(58) Field of Classification Search
CPC ......... B05B 12/06; F16K 11/07; F16K 31/38; F16K 31/383; F15B 11/06; F15B 21/12; F15B 2211/30525
See application file for complete search history.

(56) References Cited

U.S. PATENT DOCUMENTS 2,604,361 A * 7/1952 Yates .................... B23Q 11/005
239/291
3,106,937 A * 10/1963 Sands .................... F16K 17/168
137/613
(Continued)

FOREIGN PATENT DOCUMENTS

CN    203906425 U    10/2014
EP    3 009 252 A1    4/2016
(Continued)

OTHER PUBLICATIONS

Korean Office Action dated May 21, 2020 in Patent Application No. 10-2019-7012829 (with English translation), pages
(Continued)

*Primary Examiner* — Jessica Cahill
(74) *Attorney, Agent, or Firm* — Oblon, McClelland, Maier & Neustadt, L.L.P.

(57) ABSTRACT

A control valve in an intermittent air-generating device has a five-port valve, the inlet port of which is connected to a fluid supply source and the outlet port is connected to an air-spraying device. As a result of pilot air being supplied to a pilot input port, a valve element moves, and as a result of the inlet port and the outlet port being put in an ON state in which the two are in communication with each other, compressed air is sprayed from the air-spraying device. Meanwhile, as a result of the pilot air being discharged from the pilot input port by way of a discharge port, the valve element moves in the opposite direction and the inlet port and the outlet port are put in an OFF state in which the state
(Continued)

of communication between the two is blocked. The ON state and OFF state alternate intermittently.

6 Claims, 6 Drawing Sheets

(51) Int. Cl.
    *F15B 21/12*     (2006.01)
    *F16K 31/383*     (2006.01)
    *B05B 12/06*     (2006.01)

(52) U.S. Cl.
    CPC ... *F15B 2211/30525* (2013.01); *F16K 31/383* (2013.01)

(56) References Cited

U.S. PATENT DOCUMENTS

| | | | | |
|---|---|---|---|---|
| 3,612,406 | A | * | 10/1971 | Bass, Jr ............... B05B 1/3006 |
| | | | | 239/526 |
| 3,833,200 | A | * | 9/1974 | McCombs, Jr. ...... F16K 31/383 |
| | | | | 251/35 |
| 4,052,008 | A | * | 10/1977 | Rogers .................. B05B 1/005 |
| | | | | 239/526 |
| 4,124,164 | A | * | 11/1978 | Bachman ............... B05B 1/005 |
| | | | | 239/533.15 |
| 5,615,710 | A | * | 4/1997 | Sato .................... F15B 13/0889 |
| | | | | 137/625.64 |
| 2019/0232312 | A1 | * | 8/2019 | Furukawa .............. B05B 1/005 |

FOREIGN PATENT DOCUMENTS

| | | |
|---|---|---|
| JP | 9-137804 A | 5/1997 |
| JP | 10-274204 A | 10/1998 |
| JP | 2002-147624 A | 5/2002 |
| JP | 2007-139074 A | 6/2007 |
| JP | 2014-83518 A | 5/2014 |
| JP | 2016-75377 A | 5/2016 |
| JP | 2016-80033 A | 5/2016 |

OTHER PUBLICATIONS

Extended European Search Report dated Apr. 23, 2020 in European Patent Application No. 17858149.2, 7 pages
International Search Report dated Oct. 24, 2017 in PCT/JP2017/032603 filed Sep. 11, 2017.

\* cited by examiner

INTERMITTENT AIR-GENERATING DEVICE

TECHNICAL FIELD

The present invention relates to, for example, an intermittent air generating device capable of intermittently generating compressed air.

BACKGROUND ART

Heretofore, intermittent air generating devices intermittently generating compressed air have been used to, for example, blow the compressed air generated by the intermittent air generating devices against objects such as workpieces via air blow guns in order to remove dust and the like adhering on the objects.

In such an intermittent air generating device, as disclosed in, for example, Japanese Laid-Open Patent Publication No. 2016-075377, one of the outputs from an air pressure source is connected to a pilot type on-off valve, and an output port of the pilot type on-off valve is connected to an air nozzle. On the other hand, the other output from the air pressure source is connected to an inlet port of a pilot type control valve comprised of a 2-port pilot valve and, at the same time, also connected to a pilot port. Moreover, an outlet port of the pilot type control valve is connected to a pneumatic oscillator unit.

When the pilot type control valve is opened by receiving pilot pressure from the air pressure source to the pilot port, compressed air is supplied to an inlet port of the pneumatic oscillator unit. Thus, since the inlet port and the outlet port are located at positions communicating with each other, the compressed air is supplied to a pilot port of the pilot type on-off valve and blown out of the air nozzle.

On the other hand, the outlet pressure of the pneumatic oscillator unit is applied to a control input port. When the air pressure reaches a predetermined level, a valve element is displaced and causes the pressure at the pilot port of the pilot type on-off valve to decrease. This leads to closure of the valve, and as a result, the blowing of the compressed air from the air nozzle is stopped.

Intermittently supplying and stopping the compressed air from the air nozzle in this manner reduce the consumption of the compressed air.

SUMMARY OF INVENTION

However, the above-described intermittent air generating device includes the pilot type control valve in addition to the pilot type on-off valve, and thus includes two pilot valves in total. This complicates the circuit configuration and increases the number of parts and production costs accordingly.

A general object of the present invention is to provide an intermittent air generating device with a simple configuration and which can be produced at low cost and is capable of achieving stable performance.

According to the present invention, an intermittent air generating device configured to intermittently output compressed air from an air device includes:

a supply source configured to supply the compressed air; and a switching unit disposed downstream of the supply source and provided with a body and a valve element disposed so as to be movable along the interior of the body, the body including a first port to which the compressed air is supplied, a second port through which the compressed air is output to the air device, and a third port to which pilot air different from the compressed air is supplied, the valve element being configured to switch a communication state between the first port and the second port;

wherein the valve element is moved by the pilot air supplied to the third port to thereby cause the first port and the second port to communicate with each other.

According to the present invention, the switching unit is disposed downstream of the supply source and is provided with the body including the first port to which the compressed air is supplied, the second port through which the compressed air is output to the air device, and the third port to which the pilot air different from the compressed air is supplied, and the valve element disposed so as to be movable along the interior of the body. The valve element is moved inside the body by the pilot air supplied to the third, whereby the first port and the second port are caused to communicate with each other.

The body of the switching unit includes the first port to which the compressed air is supplied from the supply source and the third port to which the pilot air is supplied. The valve element is moved by the pilot air to thereby cause the first port and the second port to communicate with each other, whereby the compressed air is output. As a result, the intermittent operation can be stably performed without being affected by pressure drop when the compressed air is supplied to the air device and jetted out.

Moreover, since the pilot valve driven by the pilot air and the pilot type on-off valve are integrated into one component, the circuit configuration can be simplified, and accordingly the number of parts and production costs can be reduced, compared with conventional intermittent air generating devices.

The above-described object, features, and advantages will become more apparent from the following description of preferred embodiments in conjunction with the accompanying drawings.

DESCRIPTION OF EMBODIMENTS

Figure 1:
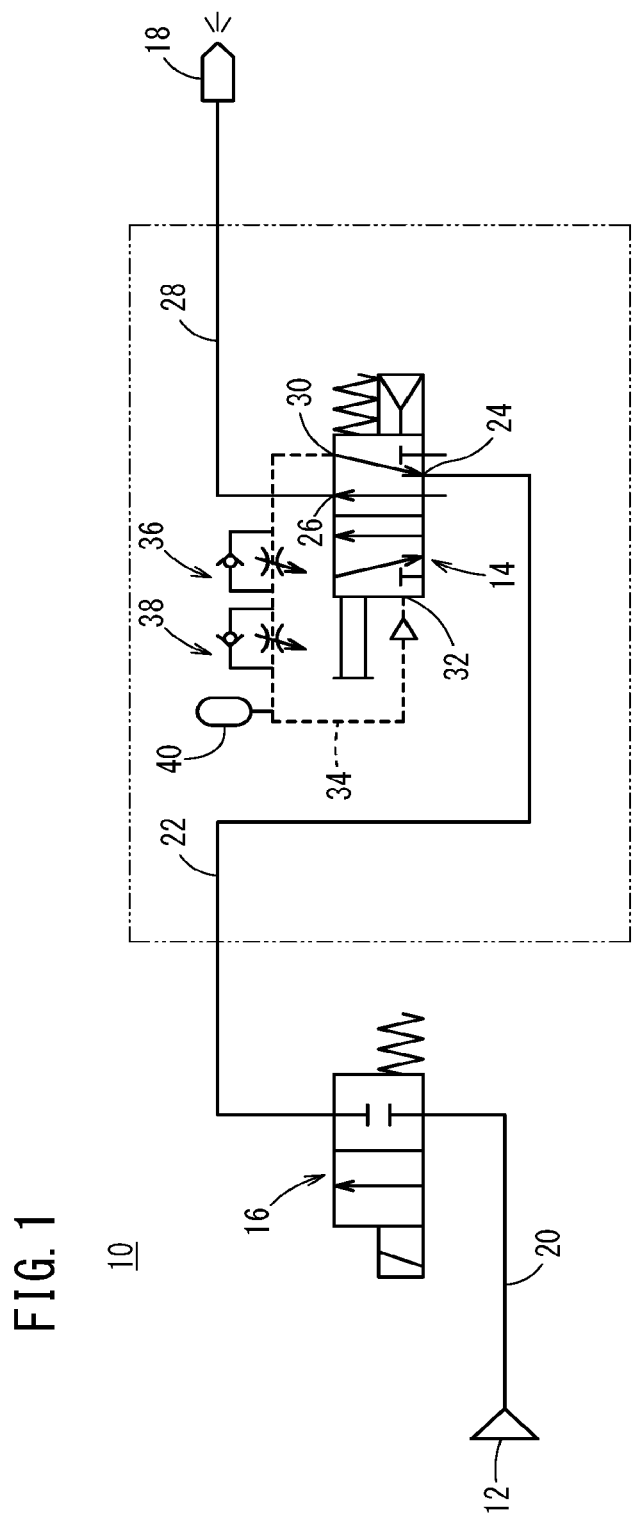
FIG. 1 is a schematic diagram of a driving circuit constituting an intermittent air generating device according to a first embodiment of the present invention.

As illustrated in FIG. 1, a driving circuit including an intermittent air generating device 10 includes a fluid supply source (supply source) 12, a control valve (switching device) 14 connected downstream of the fluid supply source 12, and a switching valve 16 disposed between the fluid supply source 12 and the control valve 14, and an air blow gun or air blow device (air device) 18 is connected downstream of the control valve 14.

The fluid supply source 12 is comprised of, for example, a device generating pressurized fluid such as a compressor, and the output side of the fluid supply source 12 is connected to the switching valve 16 via a first supply pipe 20. The switching valve 16 is comprised of a two-port solenoid valve capable of switching the communication state between the first supply pipe 20 and a second supply pipe 22 connected downstream based on a control signal from a controller (not illustrated).

Figure 2:
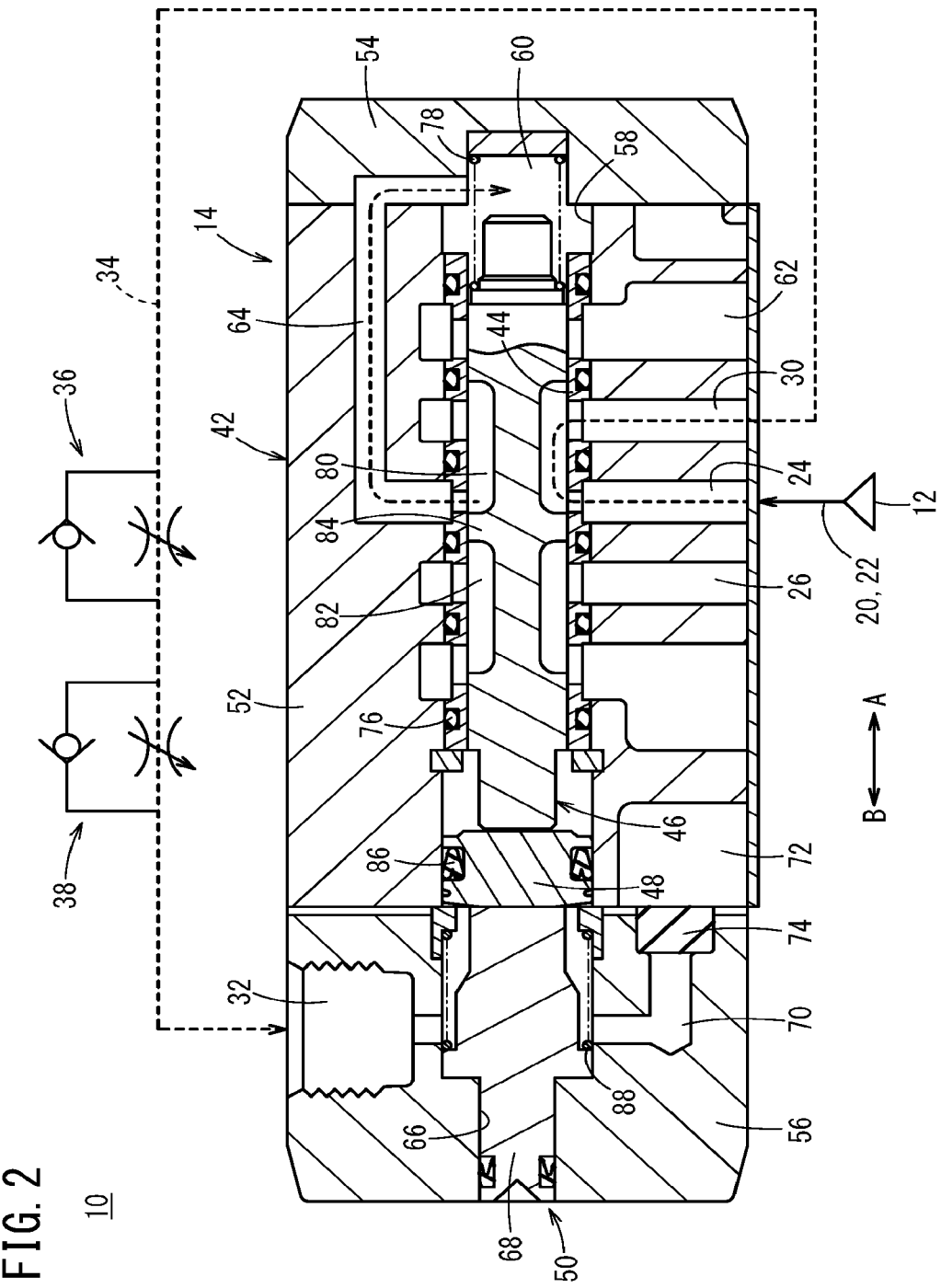
FIG. 2 is a cross-sectional view illustrating an off state of a control valve constituting the driving circuit illustrated in FIG. 1.
Figure 3:
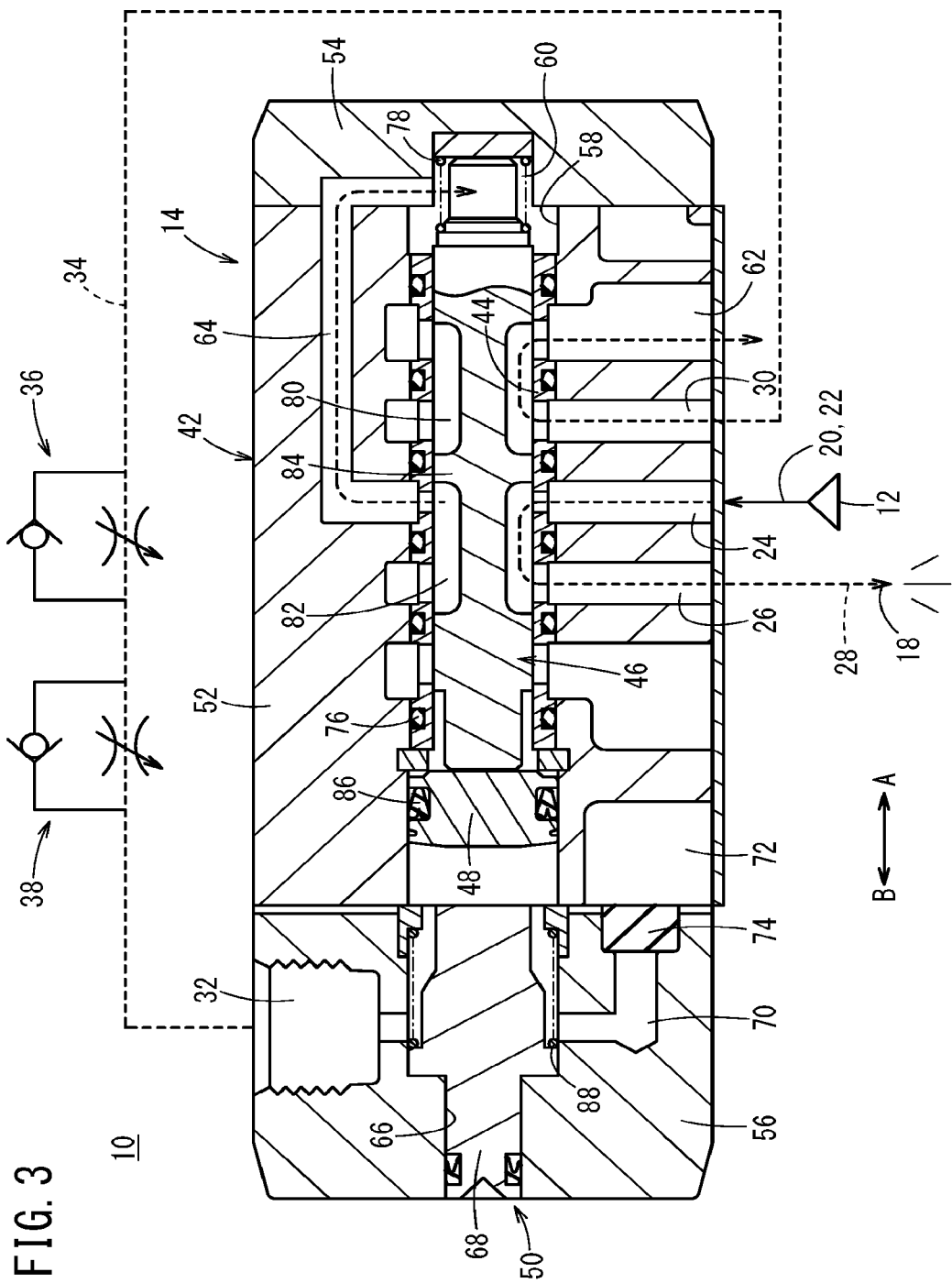
FIG. 3 is a cross-sectional view illustrating an on state where flow channels are switched in the control valve illustrated in FIG. 2.

As illustrated in FIGS. 1 to 3, the control valve 14 is comprised of, for example, a 5-port spool valve opening and closing by pilot air. An inlet port (first port) 24 of the control valve 14 is connected to the switching valve 16 and the fluid supply source 12 via the first supply pipe 20 and the second supply pipe 22, and an outlet port (second port) 26 is connected to the air blow gun 18 via an output pipe 28.

Moreover, the control valve 14 includes a pilot output port 30 through which pilot air is output and a pilot input port (third port) 32 into which the pilot air from the pilot output port 30 is input.

Furthermore, a pilot pipe 34 connecting the pilot output port 30 and the pilot input port 32 is connected to a pair of a first speed control valve 36 and a second speed control valve 38 in series, and is connected to a tank 40 downstream of the second speed control valve 38. The tank 40 is provided for the purpose of storing compressed air and finely adjusting the frequency band when the compressed air is intermittently blown or jetted out of the air blow gun 18. The adjustment can also be performed without the tank 40.

Next, the control valve 14 will be described in detail with reference to FIGS. 2 and 3.

The control valve 14 includes a valve body 42, a valve element 46 movable via a guide element 44 installed inside the valve body 42, a piston 48 movable together with the valve element 46, and a manual operating mechanism 50 capable of forcing the valve element 46 to move.

The valve body 42 includes, for example, a cylindrical body portion 52, a cover member 54 closing a first end part (located in a direction of an arrow A) of the body portion 52, and an end block 56 joined to a second end part (located in a direction of an arrow B) of the body portion 52.

A through-hole 58 extends through an inside of the body portion 52 in the axial direction (directions of the arrows A and B), and the guide element 44 and the valve element 46 are disposed inside the through-hole 58. The through-hole 58 is open at a first end part and a second end part (located in the directions of the arrows A and B, respectively) of the valve body 42. The first end part is closed by the cover member 54 and communicates with a pilot chamber 60 formed in the center of the cover member 54. The second end part of the through-hole 58 is closed by the end block 56.

Moreover, the inlet port 24 is formed in the outer circumferential surface of the body portion 52 substantially in the midsection in the axial direction (directions of the arrows A and B) to extend radially inward to the through-hole 58, and the outlet port 26 is formed on a side of the inlet port 24 adjacent to the second end part (located in the direction of the arrow B). The inlet port 24 is connected to the fluid supply source 12 via the switching valve 16 while the outlet port 26 is connected to the air blow gun 18.

On the other hand, the pilot output port 30 is formed adjacent to the inlet port 24 on a side of the inlet port 24 adjacent to the first end part (located in the direction of the arrow A), that is, adjacent to the cover member 54, and an exhaust port 62 is formed on a side of the pilot output port 30 adjacent to the first end part. The exhaust port 62 and the pilot output port 30 extend radially inward to the through-hole 58 through the guide element 44 in the same manner as the inlet port 24 and the outlet port 26.

More specifically, in the body portion 52, the inlet port 24, the outlet port 26, the exhaust port 62, and the pilot output port 30 are formed in parallel to each other and arranged at predetermined intervals in the axial direction (directions of the arrows A and B), while passing through the guide element 44 to communicate with the through-hole 58.

On the other hand, a pilot path 64 directly connecting the inlet port 24 and the pilot chamber 60 of the cover member 54 is formed inside the body portion 52. The compressed air (pilot air) supplied to the input port 24 flows along the pilot path 64 toward the first end part (located in the direction of the arrow A) of the body portion 52, and then is introduced from the pilot chamber 60 to the first end part of the through-hole 58.

A screw hole 66, into which an operating pin 68 of the manual operating mechanism 50 is screw-engaged so as to be reciprocable, passes through the central part of the end block 56 in the axial direction (directions of the arrows A and B), and the pilot input port 32 to which the pilot air is input is open in the outer circumferential surface of the end block 56. The pilot input port 32 extends radially inward to communicate with the screw hole 66 while being connected to the pilot output port 30 via the pilot pipe 34 on the outside. The screw hole 66 passes through the end block 56 to the body portion 52 and communicates with the through-hole 58.

Moreover, the pilot input port 32 communicates with a subport 70 located across the screw hole 66 from the pilot input port 32, and is open to communicate with a communication chamber 72 formed in the second end part of the body portion 52. One of the pilot input port 32 and the subport 70 is selectively used, and the port that is not used is closed by a plug 74. Here, a case where the pilot input port 32 is used while the subport 70 is closed by the plug 74 will be described.

The guide element 44 having a cylindrical shape, for example, is disposed to be in contact with the inner circumferential surface of the through-hole 58 via a plurality of seal members 76 provided on the outer circumferential surface of the guide element 44, and the valve element 46 is guided to be movable in the axial direction (directions of the arrows A and B) inside the guide element 44.

The valve element 46 is comprised of, for example, a shaft body disposed inside the through-hole 58 and the guide element 44 so as to be movable therein, and the outer circumferential surface of the valve element 46 is in contact with the inner circumferential surface of the guide element 44. A first spring 78 is interposed between the first end part (located in the direction of the arrow A) of the valve element 46 and the pilot chamber 60 of the cover member 54. The valve element 46 is biased toward the end block 56 (in the direction of the arrow B) under the elastic action of the first spring 78.

Moreover, a pair of a first annular recess 80 and a second annular recess 82 are formed in the outer circumferential surface of the valve element 46 substantially in the midsection in the axial direction (directions of the arrows A and B). The first annular recess 80 and the second annular recess 82 have a predetermined depth from the outer circumferential surface and a predetermined length in the axial direction. Furthermore, the first annular recess 80 and the second annular recess 82 do not communicate with each other due to a wall portion 84 disposed between the recesses.

The first annular recess 80 is disposed adjacent to a first end part (located in the direction of the arrow A) in the valve element 46, and the second annular recess 82 is disposed adjacent to a second end part (located in the direction of the arrow B) in the valve element 46.

The piston 48 is, for example, circular in cross section and is joined to the second end part of the valve element 46 so as to be movable in the axial direction (directions of the arrows A and B) while being in sliding contact with the inner circumferential surface of the through-hole 58. An annular piston packing 86 is attached to the outer circumferential surface of the piston 48.

The manual operating mechanism 50 is comprised of the operating pin 68 screw-engaged in the screw hole 66 of the end block 56. A first end part of the operating pin 68 faces a second end part of the piston 48, and a second spring 88 is interposed between the operating pin 68 and a first end part of the screw hole 66. The second spring 88 biases the operating pin 68 in a direction away from the body portion 52 and the piston 48 (in the direction of the arrow B).

In a case where supply of pilot air to the pilot input port 32 is stopped or the valve element 46 adheres to the inner surface and cannot be moved, for example, a worker (not illustrated) turns the operating pin 68 to move the operating pin 68 toward the piston 48 (in the direction of the arrow A). This enables the piston 48 and the valve element 46 to be pushed and forced to be moved.

That is, in a case where the valve element 46 cannot be moved toward the cover member 54 for any reason, the manual operating mechanism 50 can be used to manually move the valve element 46 to thereby switch the communication state.

In the above-described embodiment, a case where the control valve 14 is comprised of a 5-port valve has been described. However, the control valve 14 may be comprised of a 4-port valve.

The intermittent air generating device 10 according to the first embodiment of the present invention is basically configured as above. Next, the operations and the operational effects will be described. In the description below, the initial state is defined as a state where the control valve 14 is in the off state and compressed air is not supplied to the air blow gun 18 as illustrated in FIG. 2. First, when the control valve 14 is in an off state as illustrated in FIG. 2, compressed air from the fluid supply source 12 is supplied to the switching valve 16 via the first supply pipe 20. Since the switching valve 16 is in the off state, the compressed air is not supplied to the inlet port 24 of the control valve 14.

Next, the switching valve 16 is switched to the on state based on the control signal from the controller (not illustrated), and the compressed air that has been supplied to the first supply pipe 20 is introduced to the inlet port 24 of the control valve 14 via the second supply pipe 22. At this moment, since the inlet port 24 is closed by the outer circumferential surface of the valve element 46, the compressed air introduced to the inlet port 24 does not flow into the outlet port 26.

Moreover, the compressed air supplied to the inlet port 24 flows, as pilot air, into the pilot path 64 via the first annular recess 80 of the valve element 46 and is then introduced to the pilot chamber 60. At the same time, the compressed air flows from the pilot output port 30 into the pilot pipe 34 via the first annular recess 80 and is then supplied to the pilot input port 32.

The pilot air introduced to the pilot chamber 60 and the elastic force of the first spring 78 bias the valve element 46 toward the end block 56 (in the direction of the arrow B).

Thus, the piston 48 joined to the second end part of the valve element 46 is moved to be brought into contact with the end part of the operating pin 68.

Next, to change the control valve 14 from the above-described off state to the on state where the compressed air is supplied to the air blow gun 18, the pilot air is supplied from the pilot output port 30 to the pilot input port 32 via the pilot pipe 34 and then introduced to the through-hole 58. This causes the piston 48 to be pushed toward the cover member 54 (in the direction of the arrow A), whereby the valve element 46 is moved along the valve body (see FIG. 3).

With this, the second annular recess 82 faces the inlet port 24, and the inlet port 24 and the outlet port 26 communicate with each other via the second annular recess 82. As a result, the compressed air that has been supplied to the inlet port 24 flows into the outlet port 26 and is blown out of the air blow gun 18 via the output pipe 28 connected to the outlet port 26.

On the other hand, as the first annular recess 80 moves with the movement of the valve element 46, the communication between the pilot output port 30 and the input port 24 is blocked off, and the supply of the pilot air to the pilot input port 32 is stopped. Since the pilot output port 30 and the exhaust port 62 communicate with each other via the first annular recess 80, the pilot air that has been supplied to the pilot input port 32 is discharged from the exhaust port 62 to the outside.

This leads to a reduction in the pressing force by the pilot air biasing the piston 48 and the valve element 46 toward the cover member 54 (in the direction of the arrow A), and then the valve element 46 is pressed by the elastic force of the first spring 78 and the pressing force by the compressed air supplied to the pilot chamber 60 to thereby be moved in a direction away from the cover member 54 (in the direction of the arrow B).

As a result, as illustrated in FIG. 2, the communication state between the inlet port 24 and the outlet port 26 via the first annular recess 80 is blocked off (off state) again with the movement of the valve element 46, and blowing of the compressed air out of the air blow gun 18 is stopped.

The pilot output port 30 and the input port 24 then communicate with each other again, and the pilot air is supplied to the pilot input port 32 again. This causes the valve element 46 to move toward the cover member 54 to thereby be switched to the on state, and the compressed air flows from the inlet port 24 to the outlet port 26, and is then blown out of the air blow gun 18 again.

In this manner, switching the supply state of the pilot air from the pilot output port 30 to the pilot input port 32 enables the valve element 46 to alternately move to the first end part or to the second end part in the axial direction and thus to switch the communication state between the inlet port 24 to which the compressed air is supplied and the outlet port 26. This allows the compressed air to be intermittently blown out of the air blow gun 18.

The interval of the intermittent operation, that is, the interval between blowing and stopping of the compressed air from the air blow gun 18 can be freely set using the first speed control valve 36 and the second speed control valve 38 connected to the pilot pipe 34.

As described above, in the first embodiment, the control valve 14 constituting the intermittent air generating device 10 is comprised of a 5-port valve or a 4-port valve. This allows the pilot pipe 34 for supplying the pilot air to the piston 48 to be arranged separately from the first supply pipe 20 for the compressed air supplied to the air blow gun 18. Thus, when the valve element 46 is moved in the axial direction via the piston 48 to intermittently operate the air blow gun 18, the intermittent operation can be performed in a stable cycle without being affected by pressure drop occurring when the compressed air is blown out of the air blow gun 18.

Moreover, in a case where the valve element 46 sticks to the inside of the body, a worker (not illustrated) turns the operating pin 68 of the manual operating mechanism 50 to move the operating pin 68 toward the valve element 46 (in the direction of the arrow A) and to push the valve element 46. With this, the inlet port 24 and the outlet port 26 are forced to communicate with each other (i.e., to establish an on state), so that the air can be blown out.

Next, an intermittent air generating device 100 according to a second embodiment will be described with reference to FIGS. 4 to 6. Note that the same reference numerals and symbols are used for components identical to those in the intermittent air generating device 10 according to the first embodiment described above, and the detailed descriptions will be omitted.

The intermittent air generating device 100 according to the second embodiment is different from the intermittent air generating device 10 according to the first embodiment in that there is no switching valve between the fluid supply source 12 and a control valve 102.

Figure 4:
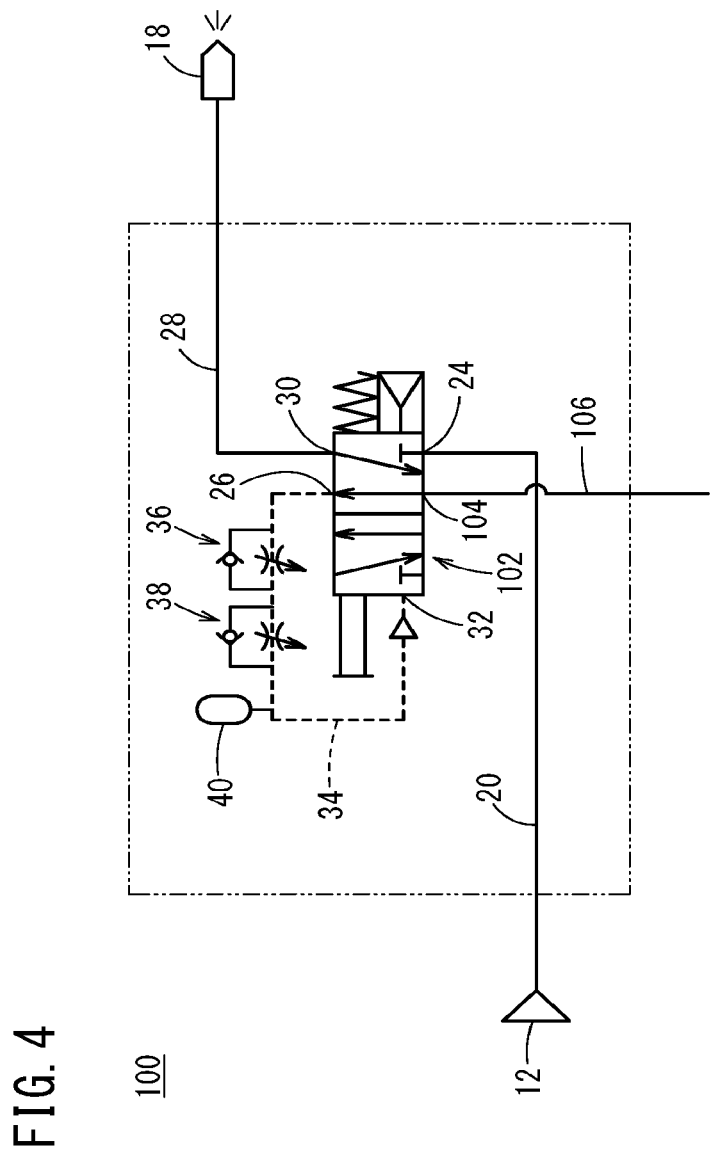
FIG. 4 is a schematic diagram of a driving circuit constituting an intermittent air generating device according to a second embodiment of the present invention.

As illustrated in FIG. 4, a driving circuit including the intermittent air generating device 100 includes the fluid supply source (supply source) 12 and the control valve (switching unit) 102 connected downstream of the fluid supply source 12, and the air blow gun (air device) 18 is connected downstream of the control valve 102.

The fluid supply source 12 is comprised of, for example, a device generating pressurized fluid, such as a compressor, and the output side of the fluid supply source 12 is connected to the control valve 102 via the first supply pipe 20.

Figure 5:
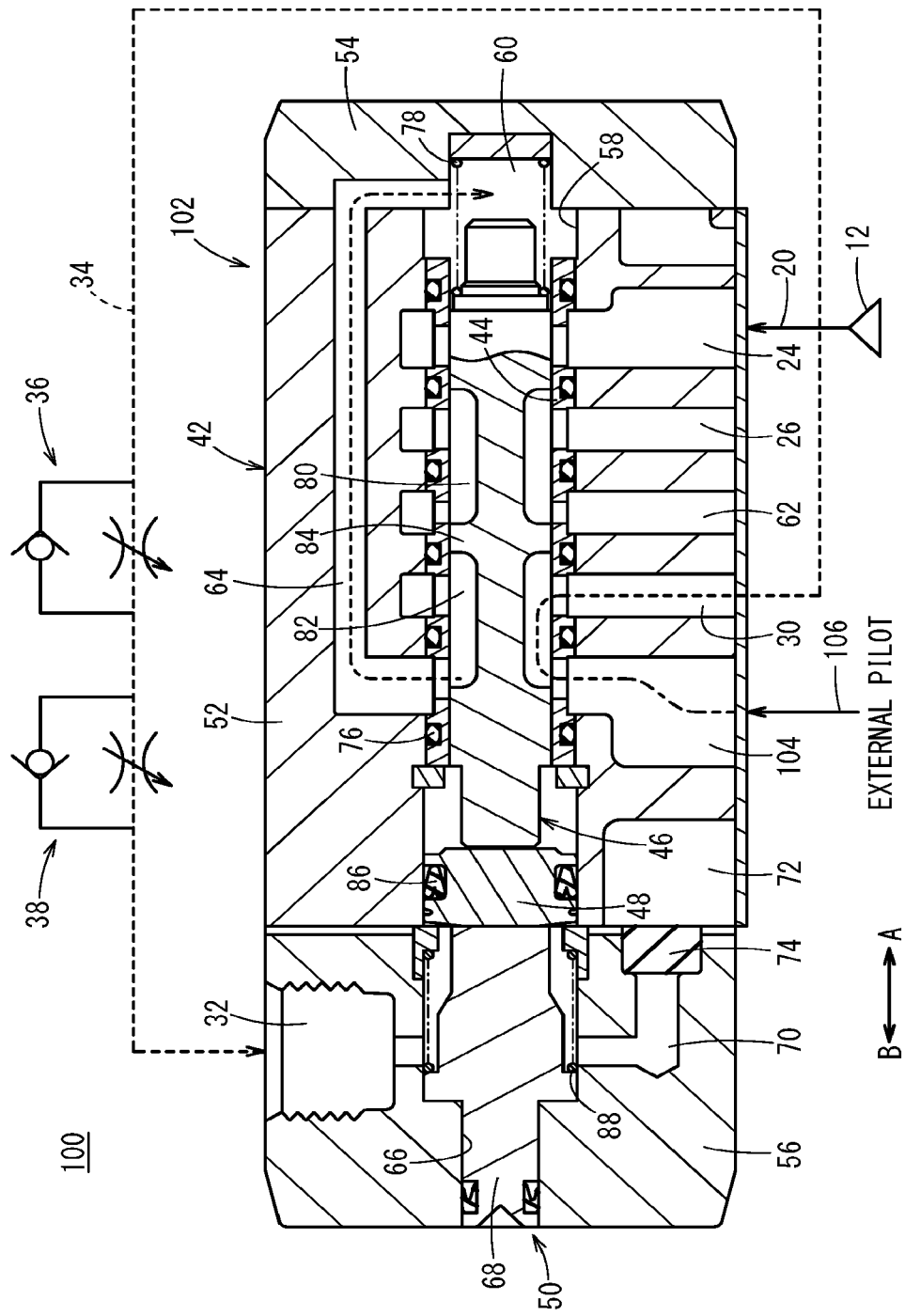
FIG. 5 is a cross-sectional view illustrating an off state of a control valve constituting the driving circuit illustrated in FIG. 4.
Figure 6:
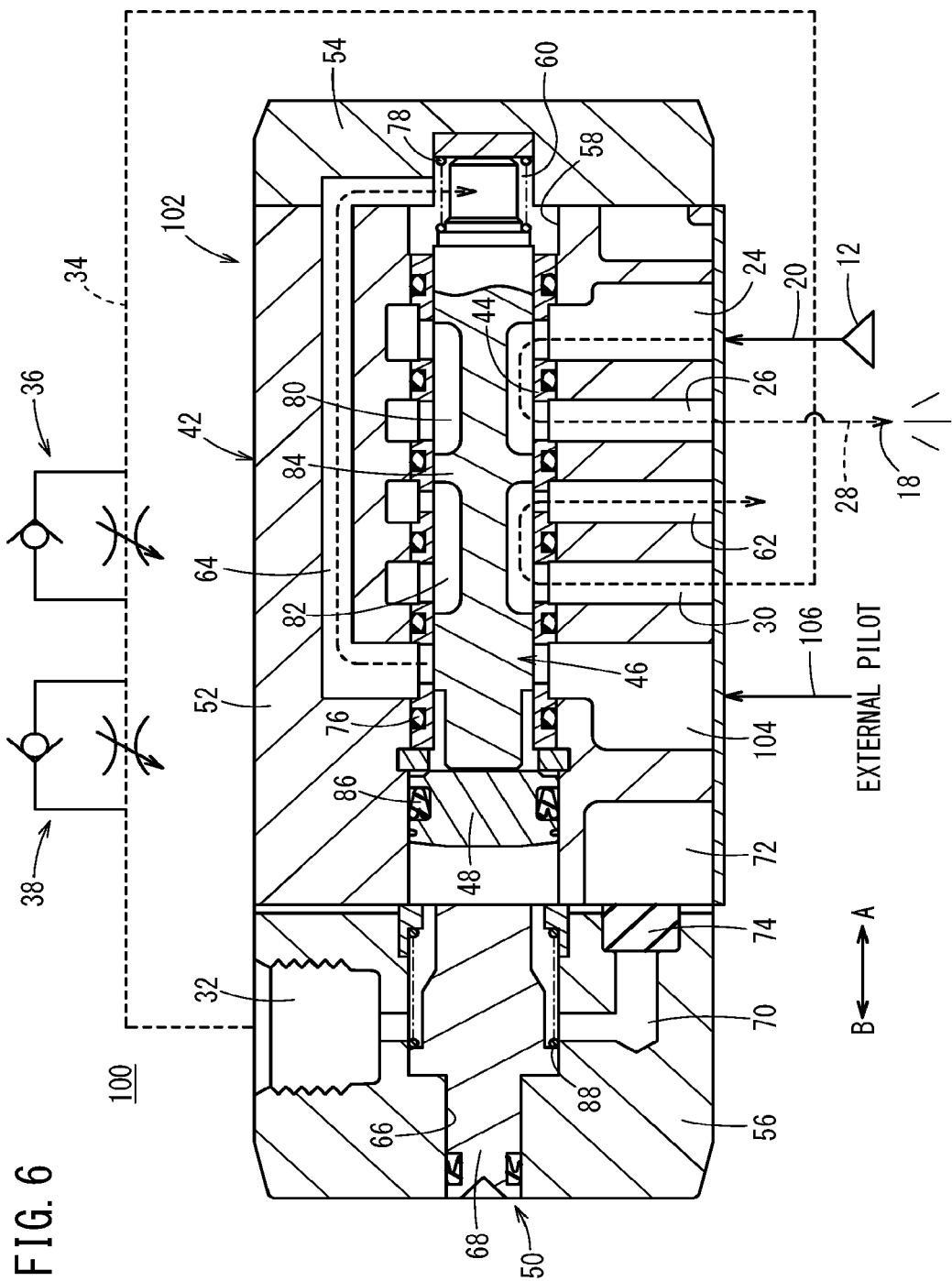
FIG. 6 is a cross-sectional view illustrating an on state where flow channels are switched in the control valve illustrated in FIG. 5.

As illustrated in FIGS. 5 and 6, the inlet port 24 is formed in the outer circumferential surface of the valve body 42 of the control valve 102 in the vicinity of the first end part adjacent to the cover member 54 (located in the direction of the arrow A) and extends radially inward to the through-hole 58. The outlet port 26 is formed on a side of the inlet port 24 adjacent to the second end part (located in the direction of the arrow B). The inlet port 24 is connected to the fluid supply source 12 while the outlet port 26 is connected to the air blow gun 18.

Moreover, the exhaust port 62 is formed in the body portion 52 of the valve body 42 on a side of the outlet port 26 adjacent to the second end part (located in the direction of the arrow B), and the pilot output port 30 is formed on a side of the exhaust port 62 adjacent to the second end part (located in the arrow B) to be substantially parallel with each other.

Furthermore, an external pilot input port 104 is formed in the body portion 52 at a position on a side of the pilot output port 30 adjacent to the second end part (located in the arrow B). The external pilot input port 104 is connected to a fluid pressure device (not illustrated) via a third supply pipe 106 and extends radially inward to communicate with the through-hole 58 as with the other ports.

The intermittent air generating device 100 according to the second embodiment of the present invention is basically configured as above. Next, the operations and the operational effects will be described.

In the description below, the initial state is defined as a state where the control valve 102 is in the off state and compressed air is not supplied to the air blow gun 18 as illustrated in FIG. 5.

First, when the control valve 102 is in the off state as illustrated in FIG. 5, compressed air supplied from the fluid supply source 12 is introduced to the inlet port 24 of the control valve 102 via the first supply pipe 20 while pilot air from the fluid pressure device (not illustrated) is introduced to the external pilot input port 104. At this moment, since the inlet port 24 is closed by the outer circumferential surface of the valve element 46, the compressed air introduced to the inlet port 24 does not flow into the outlet port 26.

On the other hand, the pilot air flows into the pilot path 64 via the second annular recess 82 of the valve element 46 and is introduced to the pilot chamber 60. The pilot air and the elastic force of the first spring 78 bias the valve element 46 toward the end block 56 (in the direction of the arrow B). Thus, the piston 48 joined to the second end part of the valve element 46 is moved to be brought into contact with the end part of the operating pin 68.

Next, to change the control valve 102 from the above-described off state to the on state where the compressed air is supplied to the air blow gun 18, the pilot air introduced to the external pilot input port 104 is supplied from the pilot output port 30 to the pilot input port 32 via the pilot pipe 34 and then introduced to the through-hole 58. This causes the piston 48 to be pushed toward the cover member 54 (in the direction of the arrow A), whereby the valve element 46 is moved along the valve body 42 as illustrated in FIG. 6.

With this, the first annular recess 80 faces the inlet port 24, and the inlet port 24 and the outlet port 26 communicate with each other via the first annular recess 80. As a result, the compressed air that has been supplied to the inlet port 24 flows into the outlet port 26 and is blown out of the air blow gun 18 via the output pipe 28 connected to the outlet port 26.

On the other hand, as the second annular recess 82 moves with the movement of the valve element 46, the communication between the external pilot input port 104 and the pilot output port 30 is blocked off, and the supply of the pilot air to the pilot input port 32 is stopped. Since the pilot output port 30 and the exhaust port 62 communicate with each other via the second annular recess 82, the pilot air that has been supplied to the pilot input port 32 is discharged from the exhaust port 62 to the outside.

This leads to a reduction in the pressing force by the pilot air biasing the piston 48 and the valve element 46 toward the cover member 54 (in the direction of the arrow A), and the valve element 46 is pressed by the elastic force of the first spring 78 and the pressing force by the compressed air supplied to the pilot chamber 60, so that the valve element 46 is moved in a direction away from the cover member 54 (in the direction of the arrow B).

As a result, as illustrated in FIG. 5, the communication state between the inlet port 24 and the outlet port 26 via the first annular recess 80 is blocked off (i.e., establishing the off state) again with the movement of the valve element 46, and blowing of the compressed air out of the air blow gun 18 is stopped.

The external pilot input port 104 and the pilot output port 30 then communicate with each other again, and the pilot air is supplied to the pilot input port 32 again. This causes the valve element 46 to move toward the cover member 54 to thereby be switched to the on state, and the compressed air flows from the inlet port 24 to the outlet port 26, and is then blown out of the air blow gun 18 again.

In this manner, switching the supply state of the pilot air from the external pilot input port 104 to the pilot input port 32 enables the valve element 46 to alternately move to the first end part or to the second end part in the axial direction and thus to switch the communication state between the inlet port 24 to which the compressed air is supplied and the outlet port 26. This allows the compressed air to be intermittently blown out of the air blow gun 18.

As described above, in the second embodiment, the control valve 102 of the intermittent air generating device 100 is comprised of a 5-port valve. This allows the pilot pipe 34 for supplying the pilot air to the piston 48 to be arranged separately from the first supply pipe 20 for the compressed air supplied to the air blow gun 18. Thus, when the valve element 46 is moved in the axial direction via the piston 48 to thereby intermittently operate the air blow gun 18, the intermittent operation can be performed in a stable cycle without being affected by pressure drop occurring when the compressed air is blown out of the air blow gun 18.

That is, the pilot air for controlling the movement of the valve element 46 and the compressed air supplied to the air blow gun 18 in order to be blown out therefrom are supplied on different lines. Thus the valve element 46 can be stably operated while the pilot air is not affected by pressure drop occurring when the compressed air is blown out.

Moreover, since the pilot valve driven by the pilot air is integrated into one component, the circuit configuration can be simplified, and accordingly the number of parts and production costs can be reduced, compared with conventional intermittent air generating devices. That is, the intermittent air generating device 100 can be produced with a simple configuration at low cost, and can achieve stable performance without being affected by pressure drop.

The intermittent air generating device according to the present invention is not limited to the embodiments described above, and various modifications can be made thereto without departing from the scope of the present invention as a matter of course.

The invention claimed is:

1. An intermittent air generating device configured to intermittently output compressed air from an air device, comprising:
   a supply source configured to supply the compressed air; and
   a switching device disposed downstream of the supply source,
   wherein the switching device includes:
   a body provided with an inlet port to which the compressed air guided from the supply source is supplied, an outlet port for outputting the compressed air to the air device, a pilot input port to which pilot air is supplied, and an exhaust port for discharging the pilot air which is supplied to the pilot input port; and
   a valve element disposed inside the body so as to be movable to an air-stop position to stop supply of the compressed air to the air device and an air-supply position to supply the compressed air to the air device;
   wherein:
   when the valve element is located at the air-stop position, communication between the inlet port and the outlet port and communication between the pilot input port and the exhaust port are respectively blocked off by the valve element, and the pilot air is supplied to the pilot input port,
   when the valve element is located at the air-supply position, the inlet port and the outlet port communicate with each other via the valve element, and the pilot input port and the exhaust port communicate with each other via the valve element, when the pilot air is supplied to the pilot input port in a state where the valve element is located at the air-stop position, the valve element is moved from the air-stop position to the air-supply position by a pressure of the pilot air against a biasing force which is biased from the air-supply position to the air-stop position,
   while supplying the compressed air to the air device by causing the inlet port and the outlet port to communicate with each other via the valve element in a state where the valve element is located at the air-supply position, the valve element discharges the pilot air by causing the pilot input port and the exhaust port to communicate with each other via the valve element, and
   as the pilot air is discharged via the valve element, the valve element is automatically returned from the air-supply position to the air-stop position by the biasing force, and the communication between the pilot input port and the exhaust port is blocked off by the valve element.

2. The intermittent air generating device according to claim 1, wherein a pilot chamber to which the pilot air is supplied is formed in the body, and
   a pressure of the pilot air inside the pilot chamber acts on the valve element as the biasing force.

3. The intermittent air generating device according to claim 1, wherein the body is provided with a spring to apply elastic force to the valve element as the biasing force.

4. The intermittent air generating device according to claim 1, wherein the body further comprises a pilot output port for guiding the compressed air which is supplied to the inlet port as the pilot air to the pilot input port, and wherein:
   when the valve element is located at the air-stop position, communication between the pilot output port and the exhaust port is blocked off by the valve element, and the pilot output port and the inlet port communicate with each other via the valve element, and
   when the valve element is located at the air-supply position, communication between the pilot output port and the inlet port is blocked off by the valve element, and the pilot output port and the exhaust port communicate with each other via the valve element.

5. The intermittent air generating device according to claim 1, wherein the body further comprises an external pilot input port to which the pilot air is supplied, and a pilot output port for guiding the pilot air which is supplied to the external pilot input port to the pilot input port, and wherein:
   when the valve element is located at the air-stop position, communication between the pilot output port and the exhaust port is blocked off by the valve element, and the pilot output port and the external pilot input port communicate with each other via the valve element, and
   when the valve element is located at the air-supply position, communication between the pilot output port and the external pilot input port is blocked off by the valve element, and the pilot output port and the exhaust port communicate with each other via the valve element.

6. The intermittent air generating device according to claim 1, further comprising a manual operating mechanism in the body, the manual operating mechanism being disposed so as to be reciprocable along an axial direction of the body, to press the valve element in the axial direction.

* * * * *